(12) United States Patent
Loce et al.

(10) Patent No.: US 6,807,304 B2
(45) Date of Patent: Oct. 19, 2004

(54) FEATURE RECOGNITION USING LOOSE GRAY SCALE TEMPLATE MATCHING

(75) Inventors: Robert P. Loce, Webster, NY (US); John C. Handley, Fairport, NY (US); Clara Cuciurean-Zapan, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 639 days.

(21) Appl. No.: 09/745,623

(22) Filed: Dec. 26, 2000

(65) Prior Publication Data

US 2003/0161534 A1 Aug. 28, 2003

Related U.S. Application Data

(63) Continuation-in-part of application No. 09/505,875, filed on Feb. 17, 2000, now Pat. No. 6,678,414.

(51) Int. Cl.[7] .............................. G06K 9/62; G06K 9/64
(52) U.S. Cl. ........................................ 382/209; 382/217
(58) Field of Search ................................ 382/209, 205, 382/217, 218, 219, 220, 221, 270, 266; 345/613

(56) References Cited

U.S. PATENT DOCUMENTS

| | | | |
|---|---|---|---|
| 4,437,122 A | | 3/1984 | Walsh et al. |
| 4,544,264 A | | 10/1985 | Bassetti et al. |
| 4,646,355 A | | 2/1987 | Petrick et al. |
| 4,791,679 A | | 12/1988 | Barski et al. |
| 4,847,641 A | | 7/1989 | Tung |
| 5,005,139 A | | 4/1991 | Tung |
| 5,067,162 A | * | 11/1991 | Driscoll et al. ............. 382/126 |
| 5,079,123 A | | 1/1992 | Nanya et al. |
| 5,134,495 A | | 7/1992 | Frazier et al. |
| 5,193,008 A | | 3/1993 | Frazier et al. |
| 5,237,646 A | | 8/1993 | Bunce |
| 5,265,176 A | | 11/1993 | Miller |
| 5,282,057 A | | 1/1994 | Mailloux et al. |
| 5,329,599 A | * | 7/1994 | Curry et al. ................ 382/266 |
| 5,365,251 A | | 11/1994 | Denber |
| 5,387,985 A | | 2/1995 | Loce et al. |
| 5,687,297 A | * | 11/1997 | Coonan et al. .............. 358/1.2 |
| 5,696,845 A | | 12/1997 | Loce et al. |
| 5,742,703 A | * | 4/1998 | Lin et al. .................... 382/176 |
| 5,912,988 A | * | 6/1999 | Moore ........................ 382/209 |
| 6,172,718 B1 | * | 1/2001 | Alvarez et al. ............. 348/625 |

OTHER PUBLICATIONS

J. Liang and R.M. Haralick, "Document image restoration using binary morphological filters." SPIE vol. 2660, 1996.*
David B. Sher and Chris Y. Cheung, "Constructing Noise–Reducing Operators from Training Images", 1992.*
Franklin C. Crow, University of Texas, Austin, TX; The Use of Grayscale For Improved Raster Display of Vectors and Characters; pp. 1–5.

(List continued on next page.)

*Primary Examiner*—Daniel Mariam
*Assistant Examiner*—Shefali Patel

(57) ABSTRACT

What is presented is a method for feature recognition using loose-gray-scale template matching including at least an initial point for locating within the received image a plurality of pixel points in gray-scale surrounding an initial point. The method has the steps of first locating the initial point and the plurality of pixel points to define feature boundaries and then generating a looseness interval about the located initial point with template information being associated therewith. The next step involves determining which one of a plurality of templates for fitting fits within a threshold looseness interval, and then outputting a signal associated with that recognized feature.

20 Claims, 12 Drawing Sheets

OTHER PUBLICATIONS

Charles Tung, Hewlitt–Packard Laboratories, Palo Alto, CA 94304; Charles Tung, "Resolution Enhancement Technology in Hewlett–Packard Laser Jet Printers," Proc. SPIE 1912, Colo.

J.R. Sanders, W.Hanson, M.Burke, R.S.Foresman, J.P. Fleming; Behind HP's Patent on RET, B.Colgen ed.; Prepared by Torrey Pines Research; c. 1990 pp. 167–169.

Douglas N. Curry, Xerox Palo Alto Research Center, Electronics and Imaging Laboratory. Palo Alto, CA 94304–1214, Hyperacuity laser image; JEI/Apr. 1993/vol. 2(2) pp. 138–146.

Adam L. Carley, Ph.D; Resolution Enhancement in Laser Printers; c. 1993 XLI Corporation, Woburn, MA; pp. 1–17.

Robert E. Coward; Area Mapping Table Look Up Scheme; Xerox Disclosure Journal—vol. 18, No. 2 Mar./Apr. 1993; pp. 217–221.

Henry R. Kang and Robert E. Coward; Area Mapping Approach for Resolution Conversion; Xerox Disclosure Journal —vol. 19, No. 2 Mar./Apr. 1994; pp. 173–172.

J.C. Handley; E.R. Dougherty;Model–based optimal restoration of fax images in the context of mathematical morpholgy;Journal of Electronic Imaging/ Apr. 1994/ vol. 3(2) p 182–189.

E.R. Doughterty; D. Sinha; Computational Gray–scale Mathematical Morpholgy on Lattices; Real–Time Imaging 1, 69085 (1995);c. 1995 Academic Press Limited.

R.Loce; E. Doughterty; Enhancement and Restoration of Digital Documents; SPIE Press, Bellingham, WA, 1997. Chapters 1–4.

* cited by examiner

FIG. 2B
PRIOR ART

FEATURE RECOGNITION USING LOOSE GRAY SCALE TEMPLATE MATCHING

RELATED APPLICATIONS

This invention is a Continuation-In-Part of U.S. application Ser. No. 09/505,875 entitled "LOOSE-GRAY-SCALE TEMPLATE MATCHING", filed Feb. 17, 2000 now U.S. Pat. No. 6,678,414.

FIELD OF INVENTION

This invention relates to systems and methods for processing images using filters. More specifically, this invention relates to systems and methods for designing and implementing image processing filters using templates wherein the filters operate on gray-scale images and the templates identify gray-scale image features for the purposes of modification or for extracting some image statistic, and for the purposes of optimization for the human visual system, or compatibility with other system modules, such as, compression algorithms, recognition algorithms and those occurring in printing and display devices.

CROSS REFERENCES

The following patents and publications are hereby incorporated by reference for their teachings:

"Method for design and implementations of an image resolution enhancement system that employs statistically generated lookup tables," Loce et al., U.S. Pat. No. 5,696,845;

"Method and apparatus for the resolution enhancement of grayscale images that include text and line art", Lin et al., U.S. Pat. No. 5,742,703.

Barski, L., and R. Gaborski, "Image Character Enhancement using a Stroke Strengthening Kernel," U.S. Pat. No. 4,791,679, Dec. 13, 1988.

Bassetti, L. W., "Fine Line Enhancement," U.S. Pat. No. 4,544,264, Oct. 1, 1985.

Bunce, R., "Pixel Image Enhancement Employing a Reduced Template Memory Store," U.S. Pat. No. 5,237,646, Aug. 17, 1993.

Carely, A. L., "Resolution Enhancement in Laser Printers," Copyright 1993, XLI Corp., Woburn, Mass.

Crow, F. C., "The Use of Gray-scale for Improved Raster Display of Vectors and Characters," *Computer Graphics*, Vol. 12, August, 1978.

Curry, D. N., "Hyperacuity Laser Imager," *Journal of Electronic Imaging*, Vol. 2, No. 2, pp 138–146, April 1993.

Curry, D. N., R. St. John, and S. Filshtinsky, "Enhanced Fidelity Reproduction of Images by Hierarchical Template Matching," U.S. Pat. No. 5,329,599, Jul. 12, 1994.

Denber, M., "Image Quality Improvement by Hierarchical Pattern Matching with Variable Size Templates," U.S. Pat. No. 5,365,251, Nov. 15, 1994.

Frazier, A. L., and J. S. Pierson, "Resolution Transforming Raster-Based Imaging System," U.S. Pat. No. 5,134,495, Jul. 28, 1992.

Frazier, A. L., and J. S. Pierson, "Interleaving Vertical Pixels in Raster-Based Laser Printers," U.S. Pat. No. 5,193,008, Mar. 9, 1993.

Handley, J., and E. R. Dougherty, "Model-Based Optimal Restoration of Fax Images in the Context of Mathematical Morphology, *Journal of Electronic Imaging*, Vol. 3, No. 2, April 1994.

Kang, H., and R. Coward, "Area Mapping Approach for Resolution Conversion," *Xerox Disclosure Journal*, Vol. 19, No. 2, March/April, 1994.

Loce, R. and E. Dougherty, *Enhancement and Restoration of Digital Documents*, SPIE Press, Bellingham Wash., 1997. Chapters 1–4.

Loce, R. P., M. S. Cianciosi, and R. V. Klassen, "Non-integer Image Resolution Conversion Using Statistically Generated Look-Up Tables," U.S. Pat. No. 5,387,985, Feb. 7, 1995.

Mailloux, L. D., and R. E. Coward, "Bit-Map Image Resolution Converter," U.S. Pat. No. 5,282,057, Jan. 25, 1994.

Miller, S., "Method and Apparatus for Mapping Printer Resolution Using Look-up Tables," U.S. Pat. No. 5,265,176, Nov. 23, 1993.

Petrick, B., and P. Wingfield, "Method and Apparatus for Input Picture Enhancement by Removal of Undesired Dots and Voids." U.S. Pat. No. 4,646,355, Feb. 24, 1987.

Sanders, J. R., W. Hanson, M. Burke, R. S. Foresman, J. P. Fleming, "Behind Hewlett-Packard's Patent on Resolution Enhancement® Technology," B. Colgan, ed., Prepared by Torrey Pines Research Carlsbad Calif., Distributed by BIS CAP International, Newtonville Mass., 1990. [Dicusses early template matching patents—Tung, Walsh, Basseti, . . . ]

Tung, C., "Piece-Wise Print Image Enhancement for Dot Matrix Printers," U.S. Pat. No. 4,847,641, Jul. 11, 1989, U.S. Pat. No. 5,005,139, Apr. 2, 1991.

Tung, C., "Resolution Enhancement in Laser Printers," in Proc. SPIE 1912, *Color Hard Copy and Graphics Arts II*, Jan. 31, 1993, San Jose, Calif.

Walsh, B., F., and D. E. Halpert, "Low Resolution Raster Images," U.S. Pat. No. 4,437,122, Mar. 13, 1984.

DESCRIPTION OF RELATED ART

A wide variety of digital document processing tasks are performed using template-based filters. Illustratively, digital document processing tasks include resolution conversion, enhancement, restoration, appearance tuning and de-screening of images. These tasks are commonly performed on monochrome and color images, as well as binary and continuous tone images. Although, due to the binary nature of conventional templates, implementing many digital document-processing tasks on continuous tone images has been problematic prior to the present invention. A continuous tone image may also be referred to as a gray-scale image.

In conventional systems and methods, a typical filter includes template operators to perform filtering of the images, where, a filter may be characterized as an operator or device that transforms one image into another image or transforms an image to a collection of information, such as image statistics. The filter is formed of a number of imaging template operators, often simply referred to as templates. These templates may be, for example, stored in a look-up table and implemented using a look-up table formalism. Or other equivalent formalisms, such as Boolean logic may be employed. The number of templates in a filter may vary between a small number of templates to thousands of templates. Due to its versatility in design, a look-up table is typically used to implement a template-based filter.

A raster is a one-dimensional array of image data, reflecting a single line of data across a single dimension, i.e., the length or the width, of the image. Further, each location, or "picture element," in an image may be called a "pixel." In an array defining an image in which each item of data provides a value, each value indicating the properties of a location may be called a pixel value. Each pixel value is a bit in a binary form of an image, a gray-scale value in a gray-scale form of an image, or a set of color-spaced coordinates in a color coordinate form of an image. The binary form, gray-scale form, and color coordinate form are each arranged typically in a two-dimensional array, which defines an image. An N-dimensional array is typically used for an N-dimensional images, where for example, N=3 for 3-dimensional topographic images.

Using the typical binary image processing setting as an example, the filter, using the templates, transforms certain observed pixel patterns in a binary image, for example, into a corresponding enhanced binary pixel pattern. Specifically, the filter observes an arrangement of pixels using a suitable window or mask. A window is an imaging algorithmic device that observes a plurality of pixels at the same time, where the plurality of pixels is located about a target pixel. The values and locations of the observed pixels are inputted into the template matching operations. After observing the arrangement of pixels, about a target pixel, the filter then attempts to match the observed pixel pattern with one or more of the templates in the look-up table. If the look-up table contains a match to the observed pixel pattern, the look-up table generates an appropriate output. The output may be an enhanced pixel pattern for the target pixel that corresponds to the observed pixel pattern. The output could also be information in other forms; for example, the output could be a code denoting the match condition, or a data to be used for a statistical characterization of image regions.

A wide variety of types and sizes of observation windows or masks are known. The particular window used in a particular application depends on the image to be analyzed and the particular process to be performed on the image. Illustratively, a 3×3 window may be used to process an image. The 3×3 window, at various locations in the image, observes a 3×3 block, i.e., a 9-pixel block, of binary-valued pixels, for example. One pixel in the window is the target pixel, which is typically the center pixel, while the other pixels in the window are the neighboring pixels. The target pixel and the neighboring pixels form a neighborhood. The window is typically scanned across an image advancing from target pixel to target pixel.

After the neighborhood is observed in the window, the neighborhood is then processed in some manner. For example, the observed neighborhood may be transformed into a vector. The vector is expressed in the form of $(x_1, x_2, \ldots x_N)$ where Ni is the number of pixels in the neighborhood and is used to represent the properties of the target pixel, including the neighborhood of the target pixel. Each element of the vector represents one of the pixels observed in the window. The vector is then used in the look-up table to generate a desired output, for example.

A look-up table may be created in a wide variety of ways. Typically, an input value is input into the look-up table and, in response, the look-up table outputs an output value. Further, the look-up table is typically created using a training image or a set of training images. "Restoration and Enhancement of Digital Documents," by R. Loce and E. Dougherty, teaches a variety of methods for designing templates based on sets of training images. The training images will occur in pairs, where one member is the "typically input image," or the "typically observed image," i.e., the "observed image," and the other image is the "ideal desired processed version of the image," i.e., the "ideal image." The training image pairs may be input into a computer program that acquires and analyzes pattern statistics between the two images, i.e., using computer-aided filter design techniques.

Conventional computer-aided filter design may be accomplished through using training-sets of document bitmaps, for example.

Illustratively, for designing a filter that enhances from a binary state to a gray-scale state, for a given pattern that occurs in the binary image about a target pixel, a training analysis system examines a target pixel at that corresponding location in the gray-scale image. The center of the window may be placed at the target pixel, for example. Based on the set of gray-scale pixels in the gray-scale image that are associated with corresponding target pixels in the binary image and gray-scale image, and associated with a similar neighborhood pixel pattern, a "best gray-scale pixel value" is determined for processing a target pixel that possess that pattern of neighborhood pixels. In other words, a template is created for the target pixels in the binary image possessing similar neighborhood pixel patterns. This analysis is performed for all binary patterns that are significant.

In this process of template selection, significance may be due to attributes such as the pixel pattern's frequency of occurrence, the pattern's effect on the generated image, or both. Accordingly, if a template, i.e., a pattern of pixels in the binary image, is considered significant with respect to template inclusion in the design process, that template will appear in the template-matching filter. Upon operating on an input image, if that pattern is observed, the observed target pixel value will be assigned or associated with a certain value, i.e., a corresponding gray-scale value. Both the observed neighborhood and the corresponding gray-scale value may be stored in the look-up table. Accordingly, the look-up table accepts input values and outputs a desired corresponding output value, i.e., maps input values to an ideal corresponding output value.

However, it should be apparent that this input/output process may be performed in various other ways without using a look-up table. One alternative approach that is equivalent to using a look-up table representation is a Boolean logic representation. In the Boolean logic representation, pixel values are used as variables in the logic architecture, such as a logical sum of products. The goal of template filter design using Boolean logic representation is to derive optimized Boolean operators, preferably statistically optimized Boolean operators.

As illustrated in FIG. 1 there is shown the basic process for template matching based on an observed image. Initially an observed image will occur (10) from which an ideal image is warranted (15). In order to generate an image as close as possible to the ideal image, a generated image (25) is created by utilizing a template matching operation (20). With the above understanding of the image processing setting we see that it is greatly desired to produce a generated image as similar as possible to the ideal image.

The conventional template matching operation is a binary matching process whereby a binary template or filter is to applied to a binary image.

For example, as illustrated in FIG. 2A a binary image (50) is initially sent to a data buffering circuit (55). After which, a binary pattern matching operation (60) is performed. Binary templates are typically defined as possessing ones, zeros, and "don't cares." With reference to FIG. 2B there is shown a typical binary matching template structure. For example, the binary templates in this example are defined with ones and X's for use in the binary matching step, where "X" denotes "don't care". After combining the buffered image data and the templates in the binary pattern matching operation (60), an enhanced data buffering step (65) to create the enhanced image (70) is exercised.

Illustrated in FIGS. 4A, 4B, and 4C is the set of images associated with an image restoration application using a filter defined by templates representing particular Boolean functions applied to a received image. FIG. 3A shows a representation of a 3×3 window and the positions of pixels ($x_1, \ldots, x_9$). The filter defined by this window and the templates of FIG. 2B possesses the Boolean function representation shown in FIG. 3B as follows:

$$y = f(x_1, x_2, \ldots, x_9) = x_5 + x_4 x_6 + x_1 x_9 + x_2 x_8 + x_3 x_7 \quad (1)$$

When employed as a translation-invariant filter, the singleton template $x_5$ behaves as an identity operator: whatever pixels are valued one and zero in the input image are valued one and zero in the output image, respectively. OR'ed onto that identity image is the result of each 2-pixel logical product. The templates corresponding to those products possess structures that straddle the origin pixel. In this configuration a template can "fit", or yield a 1, when positioned about a hole or break in a character stroke. Equation 1 is an example of an image processing operator that can be employed to repair breaks in character strokes within an image. FIG. 4 is an example of applying Equation 1 as a filter operating on an image, where FIG. 4A shows an ideal image, 4B shows an input image, and 4C shows the image resulting from applying Equation 1 as a filter to the image of FIG. 4B. The filter defined by Equation 1 produced a character (120) more likely to be recognized in character recognition operation. The restoration is not perfect. A more complicated (more and different products) filter could achieve better restoration. As shown in FIG. 4A and FIG. 4C there are still differences between the ideal image 100 and the generated image 120 resulting from the use of the filtering process defined by Equation 1.

As illustrated in FIG. 5A a system of the prior art is shown where an input image 150 is processed by a process 165 that includes binary-template-based filters 160 and combinatorial logic 170 [changed t to match the figure]; from which an output image 175 is generated and subsequently sent to a digital printer, high resolution printer or high resolution display 180.

SUMMARY OF THE INVENTION

The present invention is directed toward using loose-gray-scale template matching for recognition of features and/or characters in a document image. Character feature recognition is often referred to as Optical Character Recognition (OCR) in the art, and we may say that the present invention is directed towards OCR using a loose-gray-scale template matching process.

The present method is for feature recognition using loose-gray-scale template matching including at least an initial point for locating within the received image a plurality of pixel points in gray-scale surrounding an initial point. The method has the steps of first locating the initial point and the plurality of pixel points to define feature boundaries and then generating a looseness interval about the located initial point with template information being associated therewith. The next step involves determining which one of a plurality of templates for fitting fits within a threshold looseness interval, and then outputting a signal associated with that recognized feature.

Another aspect of the present invention is that the output signal associated with the matching template and recognized feature is used in subsequent processing to perform recognition of a larger or more global feature. For example, a collection of corners and strokes may be recognized and used as input to further recognition processing, for identification of characters. Another example is that currency marks may be recognized and provided as input to subsequent processing to identify monetary currency. The present invention therefore describes recognition of features at least two levels: recognition of the overall feature of interest (e.g., a character), recognition of smaller more primitive features such as a collection of corners to be used on a subsequent recognition algorithm for the overall feature.

Another aspect of the present invention is that the output signal associated with the matching template and recognized feature is used in subsequent processing to enhance the appearance of the feature, for example increasing the contrast or size of a small feature.

Another aspect of the present invention is that the output signal associated with the matching template and recognized feature is used in subsequent processing to perform a restoration from degradation process, an example of such restoration being the suppression or lightening degradation marks.

BRIEF DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which:

Figure 2B:
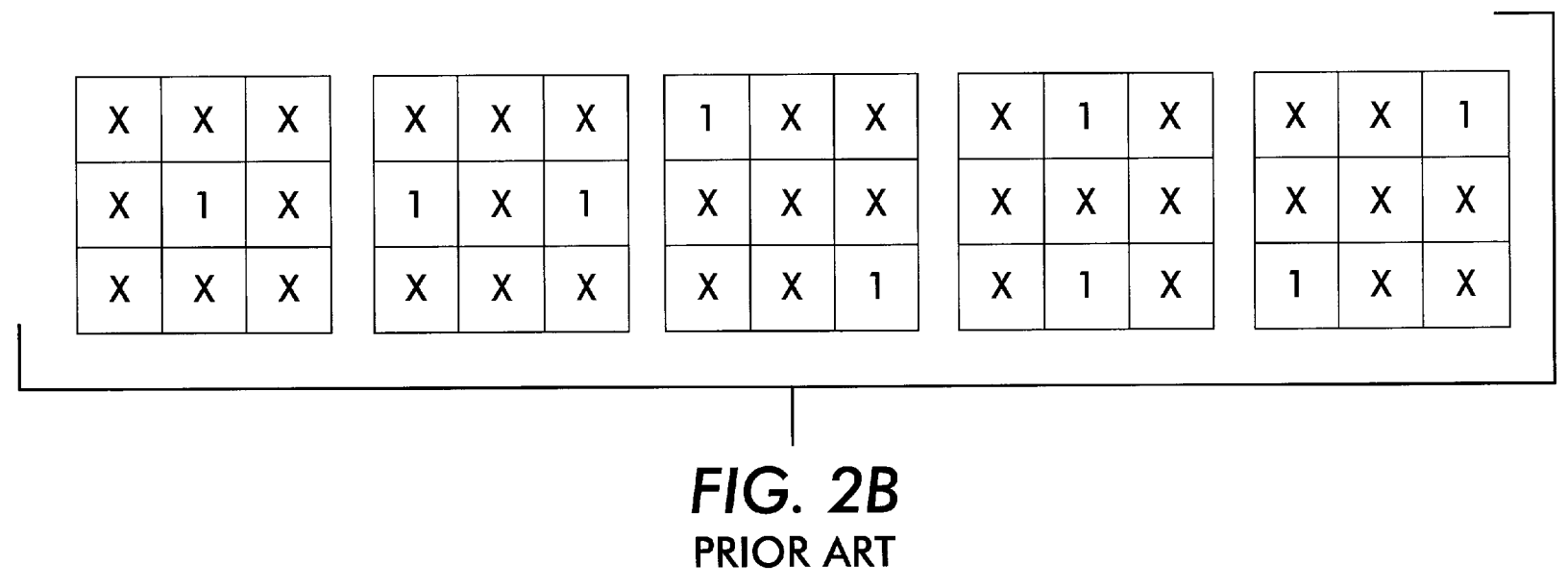

FIG. 2B shows a diagram of an example of a series of templates used in a binary matching template arrangement;

DESCRIPTION OF THE PREFERRED EMBODIMENT

Figure 1:
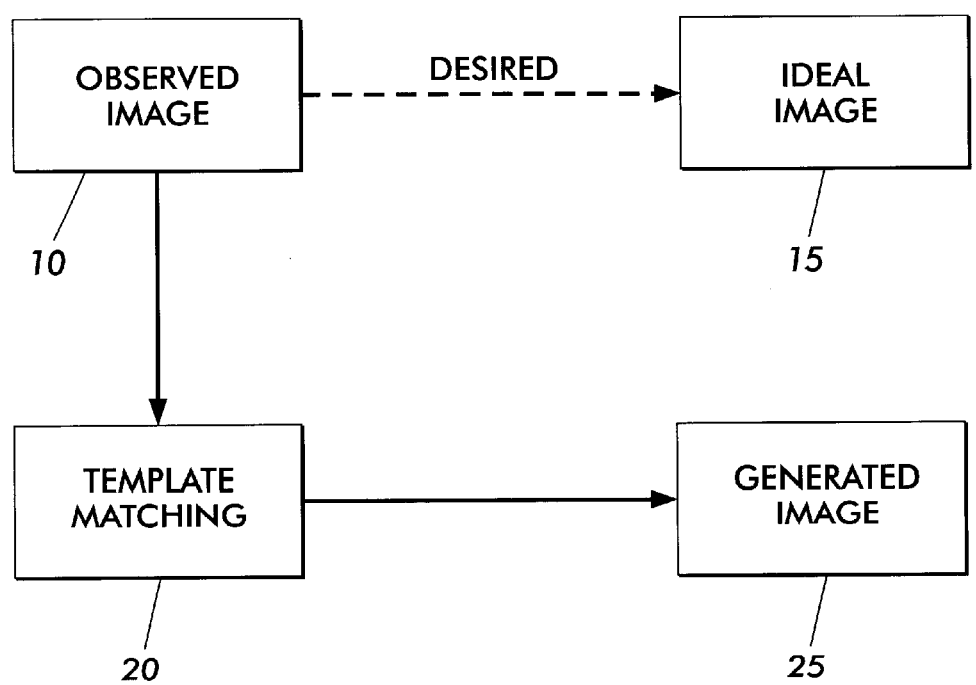
FIG. 1 is a diagram illustrating a conventional template matching filter paradigm.
Figure 2A:
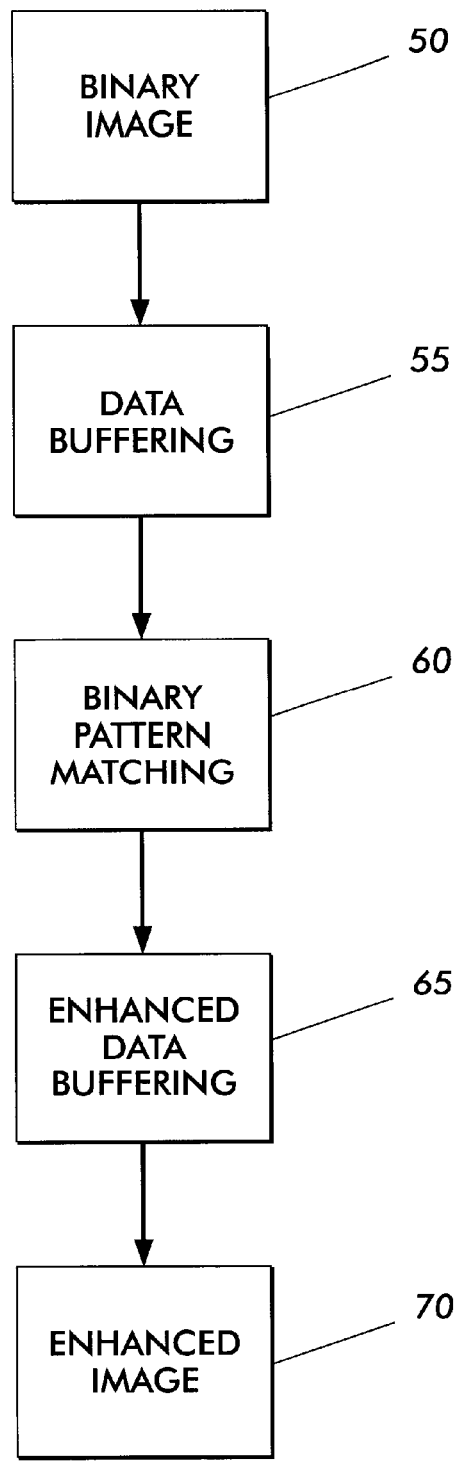
FIG. 2A shows a flowchart of a conventional binary template matching arrangement.
Figures 3A, 3B:
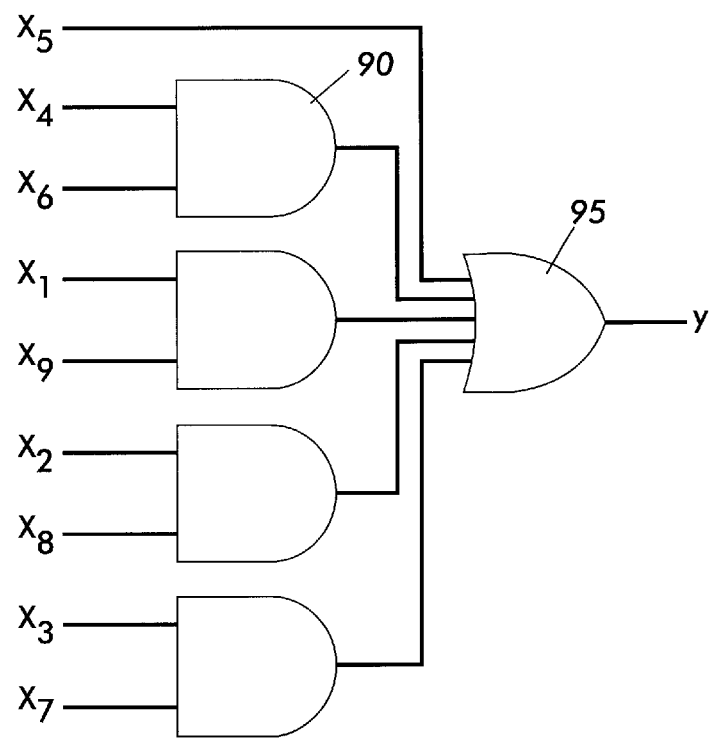
FIG. 3A shows a representation of a 3×3 window and the positions of pixels ($x_1, \ldots, x_9$)
FIG. 3B shows a diagram of a gate structure of the template matching operation for the templates of the example in FIG. 3A.
Figure 4A:
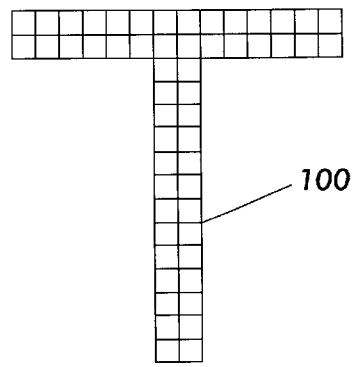
FIGS. 4A–C show a series of diagrams of an example of an ideal image, an observed image with holes and breaks and an image resulting from a template matching operation on the observed image.
Figure 4B:
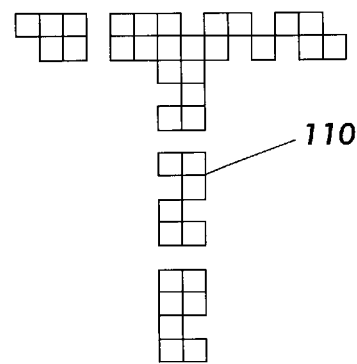
Figure 4C:
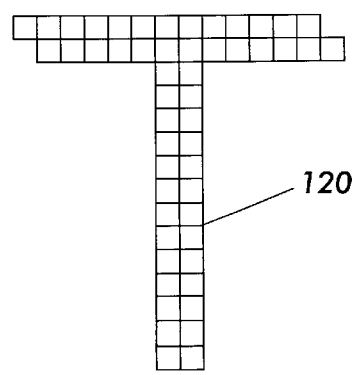

The term "bitmap" refers herein to a digital image quantized in a variety of forms, such as binary, 8 bits/pixel, or some intermediate number of bits/pixel, or some high resolution quantization state.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low." A bit is an "inverse" of another bit if the two bits have different values. An N-bit item of data has one of $2^N$ possible values.

The term "data" includes data existing in any physical form, and includes data that are transitory or are being stored or transmitted. For example, data could exist as electrical, electromagnetic or other transmitted signals or as signals stored in electronic, magnetic, or other form. The terms image signal, video data, and pixel are interchangeably used herein to describe discrete digital signals that represent the active (on) or inactive (off) state of an element within a digital image. In addition, shaded or crosshatched portions of image bitmaps depicted herein are intended to represent black or active pixels (having a value of 1 in a binary representation) within the bitmaps. Such a representation is not intended to limit the present invention, but to simplify the description thereof. Accordingly, the present invention may be operated in the same manner by substituting white pixel states wherever black pixels are indicated, and vice versa.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location. An example of a circuit is a data or address bus in an electromechanical system such as a printing system or computer.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data.

"Memory circuitry" or "memory" is any circuitry that can store data, and may include local and remote memory and input/output devices. Examples include semiconductor ROMs, RAMs, and storage medium access devices with data storage media that they can access. A "memory cell" is memory circuitry that can store a single unit of data, such as a bit or other n-ary digit or an analog value.

A "data processing system" is a physical system that processes data. An "image processing system" is a data processing system that processes image data. A "data processor" or "processor" is any component or system that can process data, and may include one or more central processing units or other processing components.

An "array of data" or "data array" or "array" is a combination of items of data that can be mapped into an array. A "two-dimensional array" is a data array whose items of data can be mapped into an array having two dimensions.

An item of data "defines" an array when it includes information sufficient to obtain or produce the array. For example, an item of data defining an array may include the defined array itself, a compressed or encoded form of the defined array, a pointer to the defined array, a pointer to a part of another array from which the defined array can be obtained, or pointers to a set of smaller arrays from which the defined array can be obtained.

"Control circuitry" is circuitry that provides data or other signals that determine how other components operate. For example, "instruction circuitry" is control circuitry that provides items of data indicating instructions to a component that includes processing circuitry. Similarly, "addressing circuitry" is control circuitry that provides items of data indicating addresses to a component that includes memory circuitry.

Control circuitry provides signals that "control" transfer of data by bus circuitry if the signals determine sources and destinations of the transfers of data by the bus circuitry. For example, the control circuitry could provide signals to a source so that it provides an item of data to the bus circuitry; the control circuitry could also provide signals to one or more destinations so that they receive the item of data from the bus circuitry.

An "image" may include characters, words, and text as well as other features such as graphics. A text may be included in a set of one or more images, such as in images of the pages of a document. An image may be divided into "segments," each of which is itself an image. A segment of an image may be of any size up to and including the whole image.

An item of data "defines" an image when the item of data includes sufficient information to produce the image. For example, a two-dimensional array can define all or any part of an image, with each item of data in the array providing a value indicating the color of a respective location of the image.

Each location in an image may be called a "pixel." Hence, a "pixel" is the smallest segment into which an image is divided or accessed in a given system. In an array defining an image in which each item of data provides a value, each value indicating the color of a location may be called a "pixel value" . Each pixel value is, for example, a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. The invention will hereafter be described in terms of a single-color gray-scale embodiment, however, there is no intent to limit the invention to such a single-color system as it has application to multicolor systems as well.

An item of data "relates to" part of an image, such as a pixel or a larger segment of the image, when the item of data has a relationship of any kind to the part of the image. For example, the item of data could define the part of the image, as a pixel value defines a pixel; the item of data could be obtained from data defining the part of the image; the item of data could indicate a location of the part of the image; or the item of data could be part of a data array such that, when the data array is mapped onto the image, the item of data maps onto the part of the image.

An operation performs "image processing" when it operates on an item of data that relates to part of an image.

Pixels are "neighbors" or "neighboring" within an image when there are no other pixels between them or they meet an appropriate criterion for neighboring. If, for example, the pixels using adjoining criteria are rectangular and appear in rows and columns, each pixel may have 4 or 8 adjoining neighboring pixels, depending on the criterion used.

The "looseness interval" of the present invention is a measure of the difference between a template and an observed neighborhood of pixels. Each pixel can possess a looseness interval and a template and neighborhood can possess an overall looseness interval. In the pixel-wise case, the looseness interval could be a simple metric, such as the absolute value of the difference between an observed pixel value and a template value. More complicated intervals may also be defined, such as intervals that are dependent upon the sign of the difference, or are a function of the difference. The function may be arithmetic, such as multiplication by a factor, algebraic, such as being raised to a power, or some other algorithmic means to represent a degree of difference between the observed neighborhood of pixels and the template. An overall template looseness interval could be a combination of the pixel looseness intervals, or it could be a function directly applied to the observed pixel neighborhood and template, where that function provides a degree of difference. Example of the overall template looseness interval are averaging of at least a portion of the pixel looseness interval, and taking the maximum of the pixel looseness intervals. In this patent specification we often use looseness interval to denote either or both a pixel looseness interval and an overall template looseness interval.

The "threshold looseness interval" is the maximum allowable value for the looseness interval that indicates a loose-fitting match. As with the definition of looseness interval, threshold looseness interval may be defined pixel-wise or overall-template-wise.

Figure 5A:
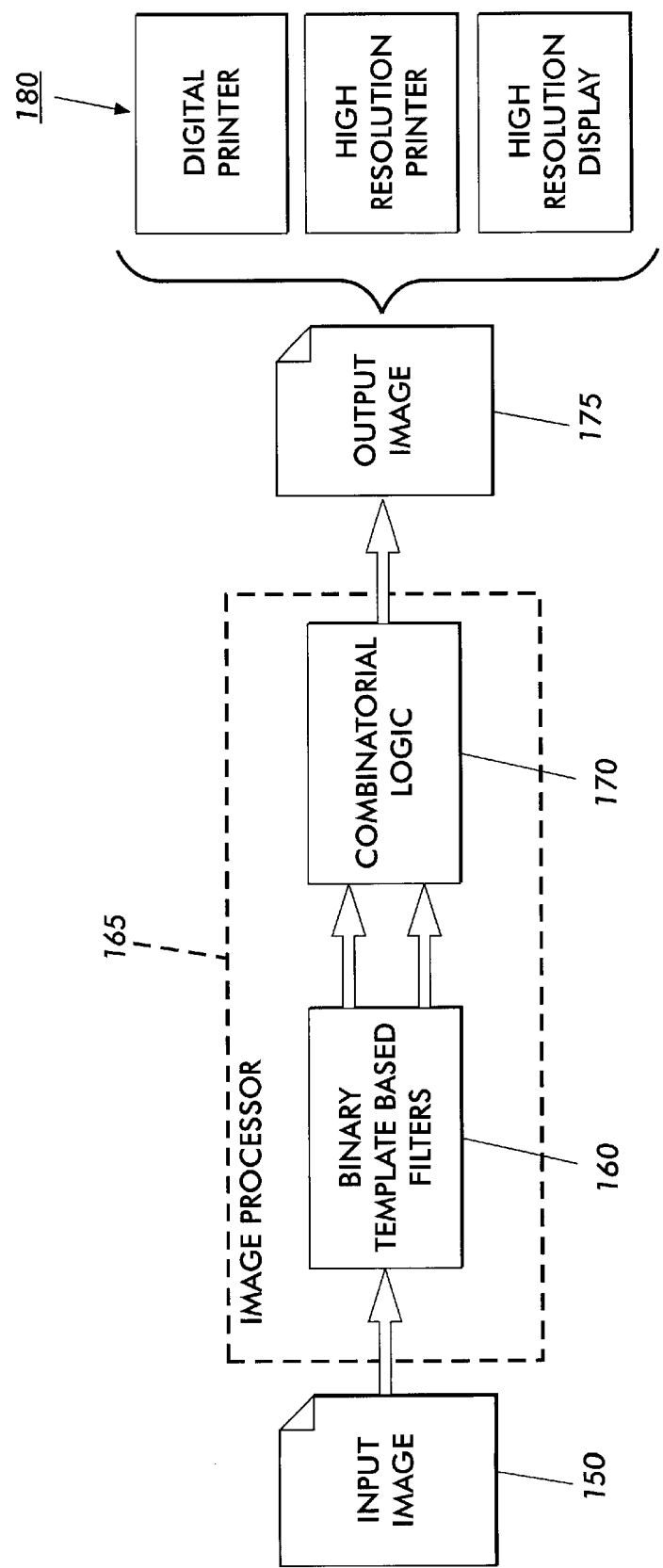
FIG. 5A shows a diagram of a system configuration using a template matching filter system according to the prior art.
Figure 5B:
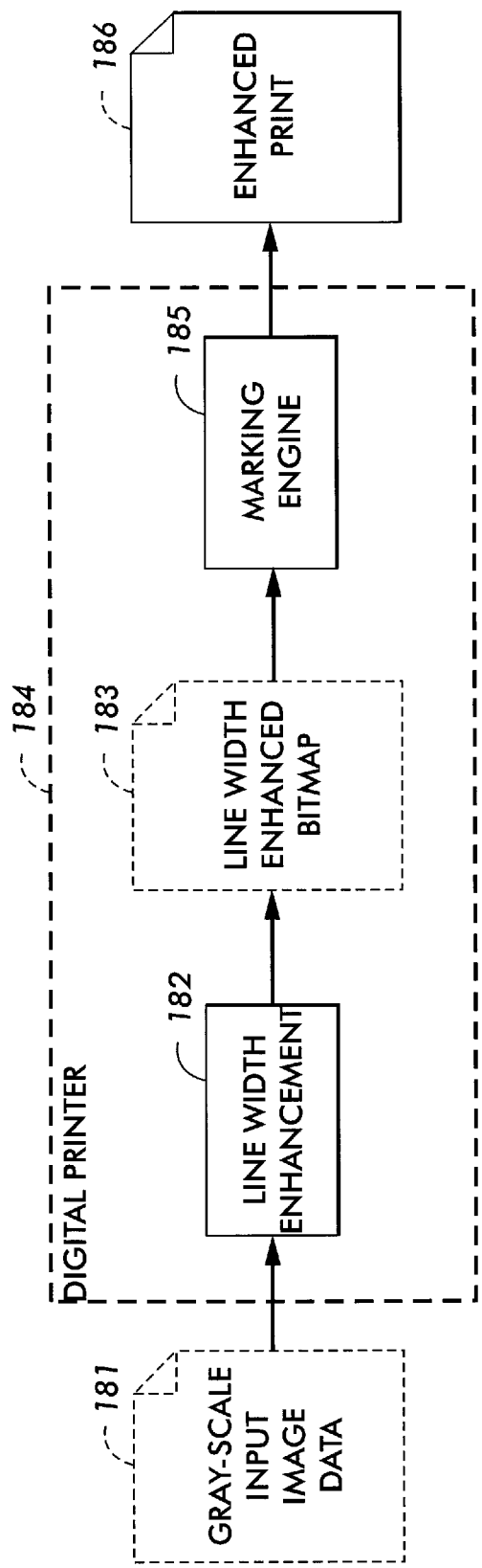
FIG. 5B shows another diagram of a system configuration using a template matching filter system of the present invention.

FIG. 5b shows gray-scale image data 181 inputted to a digital printer 184. The printer includes a line width enhancement circuit 182 and line width enhanced bitmap 183 output to a marking engine 185 to produce an enhanced printed 186. Line width enhancement in such a digital printer is typically performed for one or more of several possible reasons. One reason for the enhancement is compensation for marking process characteristics. For instance, a given marking process may not be able to print single pixel lines, and therefore it is desired to grow those lines in the digital image prior to printing to enable their representation on the final printed image. Another reason for line width enhancement is user preference, where a given user may prefer a particular darkness or thickness of character strokes, and an enhancement operation transforms the strokes from a received width to the preferred width.

Figure 6:
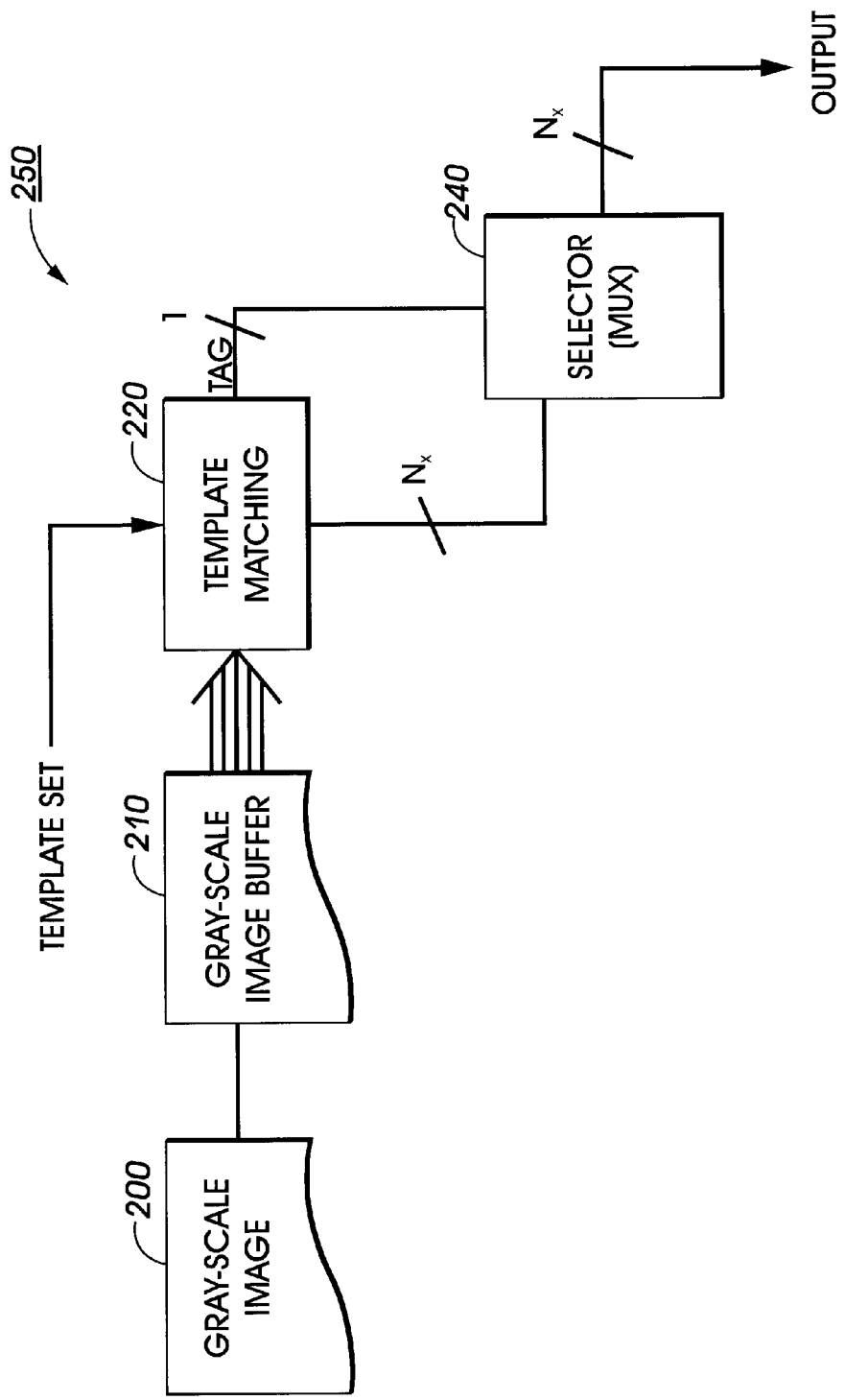
FIG. 6 is a diagram illustrating a gray-scale matching configuration in accordance with the present invention.

FIG. 6 shows one embodiment of a generalized functional block diagram of a loose-gray-scale template matching filter generation system 250 according to this invention. The template matching system 220 is connected to a template set and receives as input the gray-scale image 200 over a data buffer 210. The gray-scale image can also be received over a line signal or other link. The gray-scale image buffer provides a variety of image data to the loose-gray-scale template matching system 220.

In general the data source can be any one of a number of different data sources as an example such a source can be a scanner, digital copier, digital camera or any known device suitable for electronic source generation and/or storing or transmitting the electronic image. Further, the data source can be multiple devices hooked up serially or in parallel with the template matching system.

The data received from the data source is input to the loose-gray-scale template matching module, where one or more sets of templates are applied to the image. The signal output from the template matching block could be a match identifier, which could be passed onto a module for final signal selection, or the matching module itself could generate the final output signal by outputting the output signal associated with a matched template. The output signal could be a variety of forms such as a gray-scale pixel value, a binary pixel value, a group of binary of gray-scale pixel values, or an item of data describing the match condition.

Figure 7:
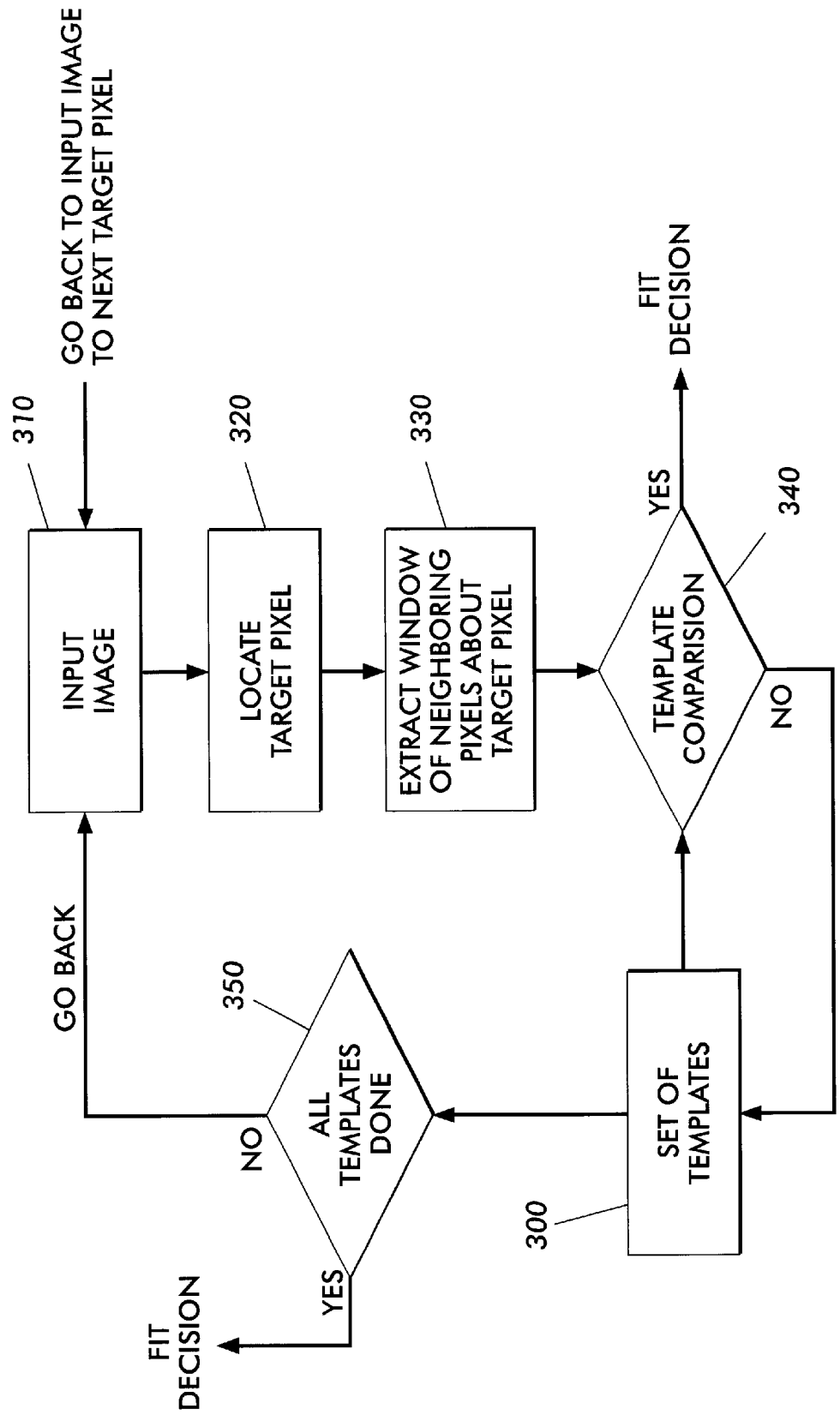
FIG. 7 is a flowchart illustrating a serial loose-gray-scale matching system in accordance with the present invention.

With reference to FIG. 7, a process for a serial implementation for matching multiple templates is shown. The loose-gray-scale template matching system includes an input image which is the output of a data source and a set of templates 300. The input image 310 is subsequently connected to locate target pixel circuit 320 for determining a target pixel. Surrounding the target pixel 330, a window is designated so as to extract a defined portion of the image about the target pixel 330. Such a window could be a 3×3, 4×4, 7×4 . . . , etc. type of matrix. Loose-gray-scale templates are stored in a template storage module 300. A template from the template storage module is input to the template comparison module 340. A loose-gray-scale template match is performed 340 on the defined portion of the image data. If a loose match occurs a fit decision is created. A fit decision could be a code that identifies the matching template, or it could be some resultant value, such as an output value or statistic of the image. If a loose match does not occur with the given template then the next template from the set of templates 300 is tested for a loose match, until there are no templates 350 to loosely match in the set 300. If none of the templates matched a different fit decision is defined, such as "do not change the value of the input image 310". An example of a fit decision is an address that could be used to access an output value stored in a look-up table. The address could be a digital value formed of several binary bits. If a fit does not occur the NO decision is passed back to the template storage module where another template may be accessed for a subsequent matching test. When all the templates are applied the image processing operation could return to the original image and extract a different neighborhood of observed pixels for further matching tests. Note that the matching tests could proceed until all templates are examined to create a collection of fit decisions, or the matching operation could have concluded upon obtaining a successful match. A process for a serial implementation for matching multiple templates is shown.

Mathematically equivalent matching processes could be employed in indirect matching operations, these would for example include match identifiers which represent a window of image data of the received image and match identifiers representing the templates and associated threshold looseness intervals.

Figure 8:
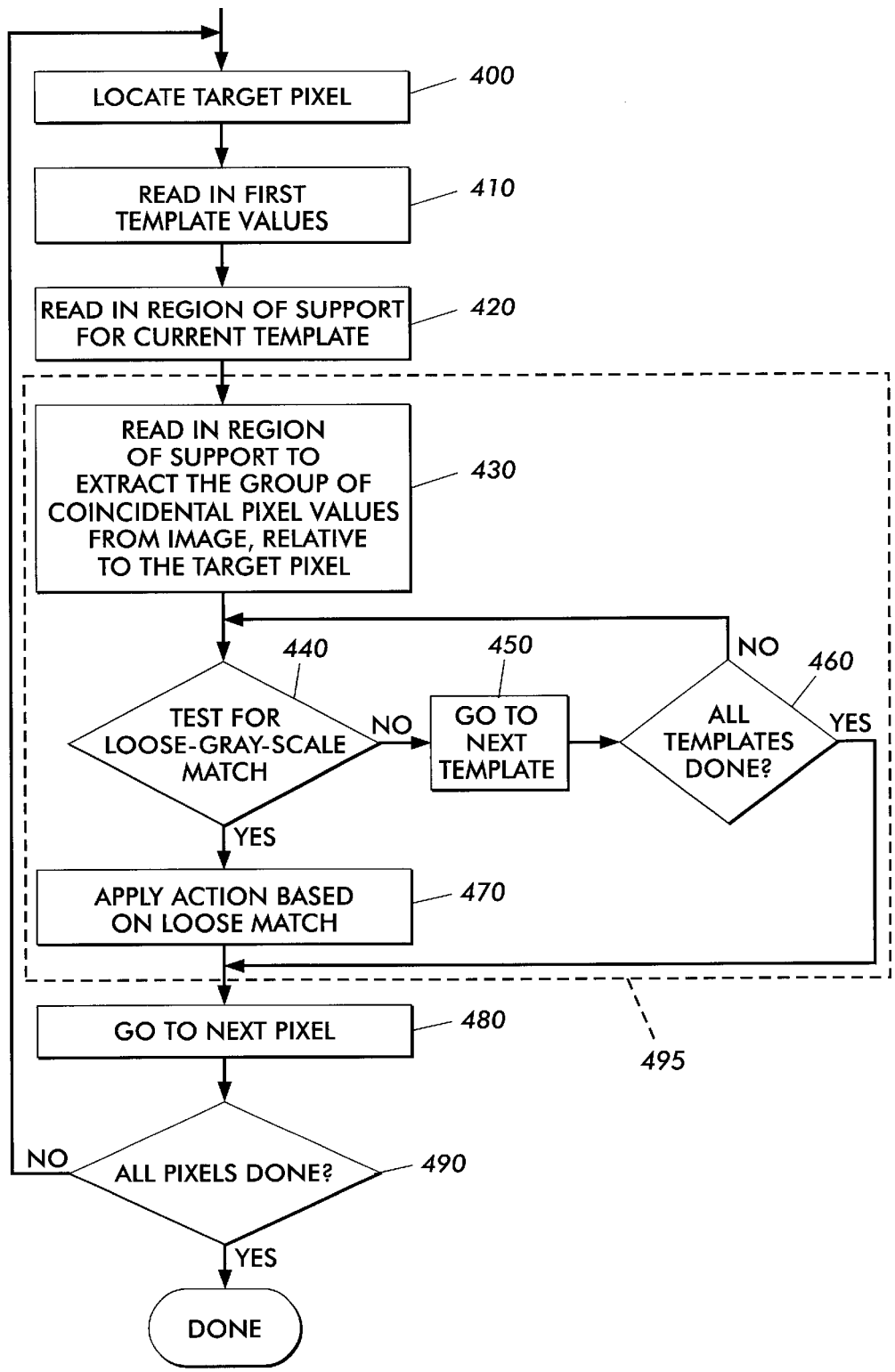
FIG. 8 is a detailed flowchart illustrating a serial test for loose-gray-scale template matching of a family of templates in accordance with the present invention.

FIG. 8 further teaches methods with a serial implementation of loose grayscale template matching. With reference to FIG. 8, in another embodiment of the present invention a serial loose-gray-scale template matching system is shown where first a target pixel is initialized 400. About the target pixel, a set of template values is read in 410 and a particular region of support for a current template is determined.

Another way of looking at this concept is a set of templates is held in memory, and successive windowed neighborhoods are compared to the stored templates. From the region of support an extraction of the group of coincidental pixel values from the image relative to the target pixel is performed 430. A test for a loose-gray-scale template fit is performed 440 and if the result is NO then the sequence proceeds to the next template 450 until all the templates are tested 460. If the test of the loose-gray-scale match is YES then an action based on loose-gray-scale match is generated for the target pixel 470.

Figure 9:
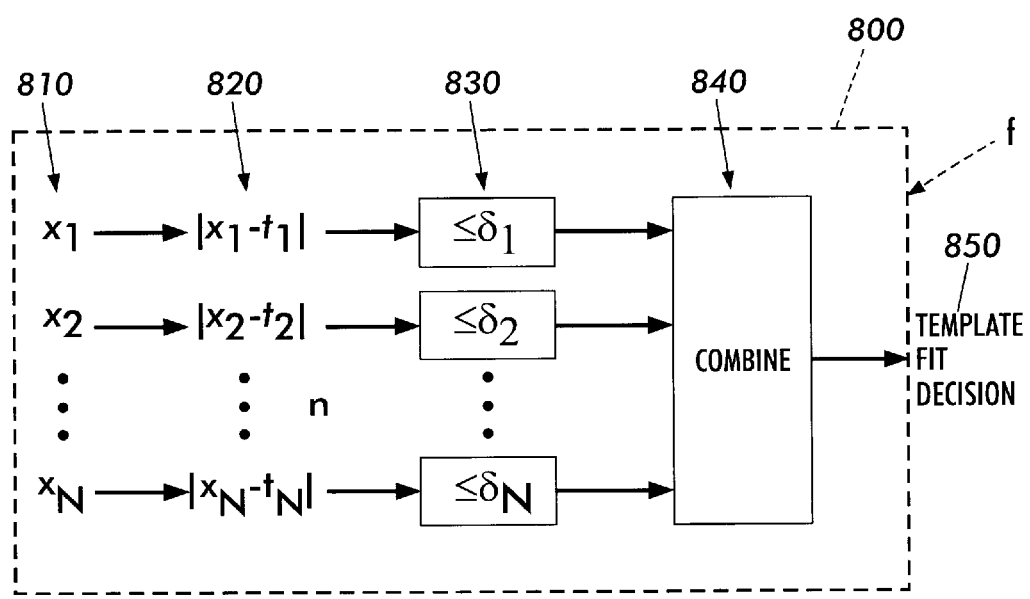
FIG. 9 is a flowchart illustrating a parallel test for a loose-gray-scale template match with one template in accordance with the present invention.

In reference to FIG. 9, there is shown an embodiment of a parallel test 800 functionally denoted by f for a single template T performing a matching operation using loose-gray-scale template matching according to the present invention. In particular, the present invention receives a series of input pixels $(x_1, x_2, \ldots, X_N)$ 810 where N is the size of the neighborhood in number of pixels and applies a loose-gray-scale match.

Starting with the definition of loose-gray-scale template matching, several implementation and processing schemes using sets or multiple sets of templates will be described below.

For a single template T there is a loose match between the digital image in the observation window and the template when each pixel of the observation window, has an absolute value difference 820 between the image value at each pixel $x_i$ and the template value for each pixel $t_i$ that is less or equal 830 to the chosen looseness interval threshold $\delta_i$. The aforesaid absolute value difference in this embodiment is the looseness interval for each pixel in the window, and the limiting value for looseness acceptability for a match at each pixel is the looseness interval threshold. A loose-gray-scale template is composed of the template pixels values $t_i$ and the threshold intervals $\delta_i$, or a single threshold interval for the template In this embodiment we employ looseness intervals and looseness interval thresholds for each pixel in the window, and all, or some predefined number of looseness intervals must be less than the threshold looseness interval to define a loose match. The individual looseness interval decisions are evaluated in concert in combine block 840 to generate an overall fit decision 850.

The template fitting process may be formulated as shown in Eqs. 2 and 3 where it is chosen to define a loose fit as having all pixel looseness intervals possess values less than or equal to their respective looseness interval thresholds, $$f(x_1, x_2, \ldots, x_N; T) = f(x_1, x_2, \ldots, x_N; t_1, t_2, \ldots, t_N) = \min \{I_{(0,\delta i]} |x_i - t_i|; i=1, \ldots, N\} \quad (2)$$

where $$I_{(0,\delta i]}(u) = 1 \text{ if } 0 \leq u \leq \delta_i \text{ and } 0 \text{ otherwise} \quad (3)$$

and where I is called the characteristic function or indicator function and I| is the absolute value.

We have expressed a loose-fitting template as a set of pixel values and corresponding threshold looseness intervals. There are alternative representations, such as two templates, one that specifies the lower bound that pixels may possess and the other template specifies the upper bound that pixels may possess to qualify as a loose-fitting match. That representation can be written as the following equation, $$f(x_1, x_2, \ldots, x_N; T) = f(x_1, x_2, \ldots, x_N; t_1, t_2, \ldots, t_N) = \min [I_{[ai,bi]}(x); i=1, \ldots, N] \quad (4)$$

where $$I_{[ai,bi]}(u) = 1 \text{ if } a_i \leq u \leq b_i \text{ and } 0 \text{ otherwise} \quad (5)$$

One advantage of this representation is that the threshold looseness interval is not limited to be symmetric about a central value.

There are other mathematical means to express the matching condition as described in Eqs. 2 and 3. One such equivalent form that we have found useful is provided in Eq. 6, $$f(x_1, x_2, \ldots, x_N; T) = f(x_1, x_2, \ldots, x_N; t_1, t_2, \ldots, t_N) = \min [I_{[di,si]}(x_i); i=1, \ldots, N] \quad (6)$$

Where $$s_i = t_i + \delta_i$$

$$d_i = t_i - \delta_i \quad (7)$$

Hence, there are a multitude of means to compute loose matches according to the loose-fitting criteria of the present invention. Another example is that loose matching could be determined by performing exact matching operations at lowered quantization, that is, an exact match using only the upper three bits of an eight bit pixel value is a loose match with respect to the pixel value at 8 bits. It is the intention of this patent to cover all such equivalent forms of the loose-fitting criteria.

Note that alternative looseness criteria may be applied. For instance, an overall template looseness interval may be computed by processing the individual pixel looseness intervals with an operation such as averaging a selected group, or taking their collective maximum value. That overall template looseness interval could then be compared to an overall threshold looseness interval to establish a match or no match condition.

Figure 10:
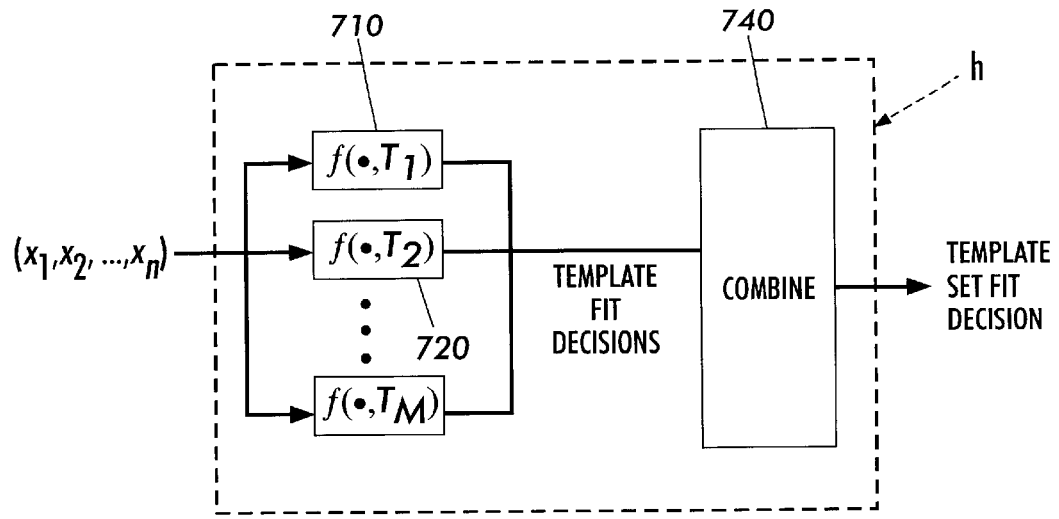
FIG. 10 is a diagram illustrating a parallel test for a family of templates performing matching operations using loose-gray-scale template matching in accordance with the present invention.

In FIG. 10, there is illustrated another embodiment of the present invention of a parallel test for loose-gray-scale template matching for a set of templates functionally denoted as h. Template matching filters will usually be composed of multitude of template, which refer to as the template set or a template family. Here, the values for each template are stored into memory as well as the corresponding threshold looseness intervals. In the figure the template values are channeled simultaneously to the processing step where a looseness fit is ascertained for each template in parallel. A fit decision is generated for each loose match test and then the information is combined in a manner to reach an overall fit decision of whether a particular template loosely matched or not. By performing a parallel loose match operation more decision making steps can be performed in a shorter interval of time. Parallel implementation is a preferred embodiment in applications implemented in hardware, such as an Application Specific Integrated Circuit (ASIC), whereas serial implementation as shown in FIG. 7 are typically preferred for software implementations.

In a template-wise parallel implementation, for a collection of M templates, we can say that there M loose matching template operators $f(*, T_i)$ i=1, ..., M, operating in parallel for a set of templates $(T_1, T_2, \ldots T_M)$. The results of each individual template match decision are combined in a manner so as to generate the overall template set fit decision. FIG. 10 illustrates an embodiment of this template-parallel method where a serial input of digital image data is converted in parallel and combined to make the overall template fit decision. The combine block 740 can take a variety of forms. If the template fit decisions are disjoint, that is, only one template can loosely fit, the combine block can simply select the match decision that yielded a match. If the match decisions are not disjoint, the combine block must in some cases arbitrate between multiple matches. In this case we have found it beneficial to give priority to certain templates to allow the combine block to select a match of higher priority. Useful priority criteria have been based on template size (number of pixels) and threshold looseness intervals. A smaller threshold looseness interval would tend to indicate a more exact match and would be given priority in typical applications. Note that other related arbitration criteria fall within the scope of the present invention.

Figure 11:
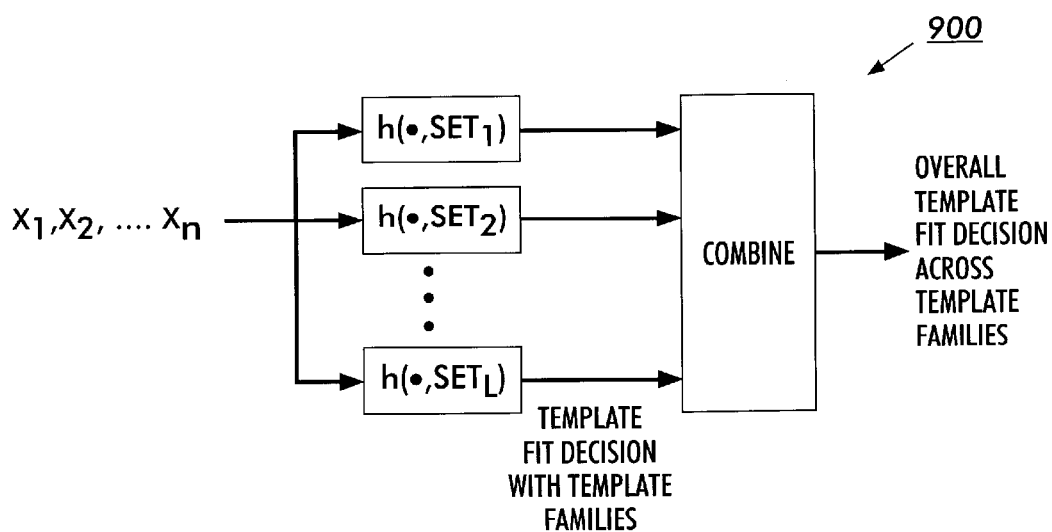
FIG. 11 is a diagram of multiple families of templates performing a template matching operation using loose-gray-scale template matching in accordance with the present invention.

Also, various templates may be grouped in sets wherein each set serves a particular processing task. Within each group, the templates may be arranged or a general arbitration procedure may be defined. The arbitration procedure may be a logical expression or a functional combination of the individual loose matching results. A family-parallel embodiment of this concept is shown in FIG. 11. In FIG. 11 the pixel values of the observed neighborhood are inputted to multiple parallel matching channels, where each is will apply a filter defined by a family, or set, where matching with a set of templates is shown in FIG. 10.

In the processing of digital documents, it has been and will be desirable to recognize a wide variety of images features within a given document. Features in an image that one needs to find for any number of reasons can be found using Loose Gray Scale Template Matching. Examples are features in currency for currency detection (or any such document), features within characters (corner sharpening), ink trap creation or deepening, recognition of serifs for thickening, and marks of a photoreceptor belt for position recognition. Further examples are in the art of remote sensing (e.g., missile silos), medical features (e.g., fracture lines in x-rays), security application features (e.g., structures in fingerprints), manufacturing features (marks on parts in assembly and quality control operations), document features (serifs, corners, vertical strokes, horizontal strokes, diagonal strokes, glyphs, platen cover marks, ink traps, paper edges, registration marks, binding holes and marks, currency marks, and marks on financial and secure documents).

Character recognition is the process of converting images of text into symbolic representation of characters comprising text. It is a major function of document processing systems, on the desktop as well as in the document conversion business. The basic steps in character recognition are 1) scanning the document, 2) identifying individual character images on a page, 3) computing measurements or features for each character image, and 4) using the features to determine the correct symbol corresponding to the character image. This process is not flawless but error rates continue to decrease as sophisticated technologies from pattern recognition, artificial intelligence, image processing, and linguistics are brought to bear on the problem. Nearly all character recognition systems operate on binary image data. If characters are scanned in gray-scale, they are first thresholded and then processed. Character recognition can be done directly on the gray character image. There are several reasons for this.

1. Gray images contain more information about the character so one can expect to recognize characters more accurately in gray-scale.

2. Thresholding, if not done optimally, can destroy essential properties of the character image. Threshold too high and strokes are broken; too low and bowls are filled in. Binarization necessarily adds noise and uncertainty to the process.

3. Since gray scale images contains more information at a given resolution than binary images, one could obtain reasonable recognition accuracy at a lower resolution in gray-scale.

4. Some character recognition methods, especially those reading handwritten characters, extract features from an anti-aliased image that is scanned in a binary mode. Gray scale representations afford a greater variety of features. But one could use the gray image itself.

One barrier to doing gray-scale character recognition is the inability to reign in the immense variability of characters in gray-scale because there can be too many patterns of gray pixels. However, Loose Gray Scale Template Matching provides a means to surmount this problem by making a decision based on a huge number of gray patterns with a small, simple test, e.g., does the pattern fit loosely to a template? Templates can be designed using statistical estimation techniques employed by the tree-structured classification method discussed elsewhere and implemented quickly using the high-speed architecture.

Below is a flow chart depicting how such a character recognition system would work:

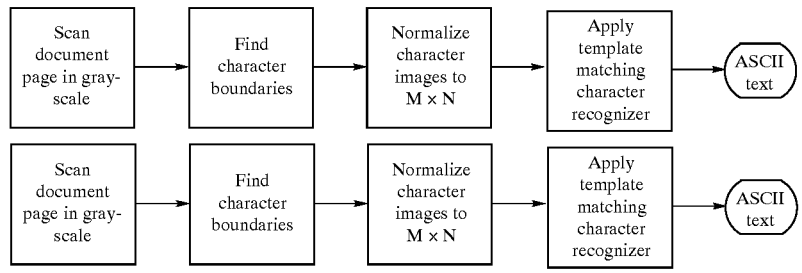

It is envisioned herein that applications of gray-scale character recognition include: document conversion, forms processing, bank check processing, parts inspection, signature verification, indexing for digital libraries, and image compression.

The use of loose-gray-scale template matching in recognition process can operate in several ways. One process could perform matching operations directly on the desired feature, such as directly applying templates to match a character. Another process could recognize more primitive features like corners, vertical, horizontal or diagonal stokes, and foreground-background transitions. The recognition of those features can be used in a subsequent processing algorithm to identify a character that possesses those features. Hence, the present invention covers in scope both the process of template matching an overall desired feature (e.g., character) and the recognition of primitive features (e.g., corners) to be used in overall feature identification. Another example of primitive features and overall features are marks within monetary currency, and the currency itself.

Feature recognition via loose-gray-scale templates can be applied to aid in subsequent image processing operations other than overall feature recognition. For instance, loose-gray-scale templates can be used to recognize fine features so that the contrast of that feature may be enhanced. Unlike linear filters, Loose Gray Scale Template Matching filters can have responses that adjust to local shape information. Matching a feature, thereby yielding a feature recognition, using this preferred method can generate an output signal that can be used in image enhancement and restoration algorithms. Smoothing an image or sharpening an image may be better performed using Loose Gray Scale Template Matching than the conventional linear formulation because one can more specifically tune the response of the filter to yield the desired output. The result may be preserved or enhanced edges and reduced noise on smooth regions. Loose Gray Scale Template Matching is well-suited to work with a secondary operator. That is, templates can be used to select which subsequent operation to perform. For example, if a special edge preserving template does not fit, use a low pass filter for noise removal. Loose Gray Scale Template Matching can be done on multiple frames of an image sequence. For example, a windowed observation can consist of pixels surrounding pixel, but also pixels near it in adjacent frames. This would allow object detection, scene change detection, object tracking, and restoration, etc. Loose Gray Scale Template Matching facilitates feature detection in multiple separations simultaneously. An example application is trapping where smooth adjacent edges must be adjusted to prevent spurious colors when printed.

Actions of Loose Gray Scale Template Matching can be "vector." That is, a loose template match in one or several dimensions (e.g., color planes or temporally separated frames in a sequence) can elicit a vector of actions such as pixel modifications in all or some color planes simultaneously, for example. This is similar in spirit to vector error diffusion and vector template matching.

In summary, what is presented is a method for feature recognition using loose-gray-scale template matching including at least an initial point for locating within the received image a plurality of pixel points in gray-scale surrounding an initial point. The method has the steps of first locating the initial point and the plurality of pixel points to define feature boundaries and then generating a looseness interval about the located initial point with template information being associated therewith. The next step involves determining which one of a plurality of templates for fitting fits within a threshold looseness interval, and then outputting a signal associated with that recognized feature.

Although the present invention has been described and illustrated in detail above and through the Figures, it is intended that the spirit and scope of the invention be interpreted as including the foregoing by way of illustration, and that the same be limited only by the appended claims as interpreted in light of the foregoing and all other equivalents.

What is claimed is:

1. A method for feature recognition using a method for matching a plurality of templates with a received image comprising:
   (a) receiving an image comprised of gray-scale image data;
   (b) generating a two-dimensional window of the received gray-scale image data, the two-dimensional window having a target gray-scale pixel and a plurality of surrounding gray-scale pixels, each gray-scale pixel being associated with a pixel of received gray-scale image data in the two-dimensional window;
   (c) determining a plurality of looseness intervals for one template of a plurality of templates, each looseness interval being a difference between a gray-scale pixel associated with the two-dimensional window and a template gray scale pixel from the template and corresponding to the pixel location in the two-dimensional window;
   (d) determining a template looseness interval value for the template based upon the determined plurality of looseness intervals;
   (e) comparing the determined template looseness interval value to a threshold looseness interval value, the threshold looseness interval value being a maximum allowable value for the determined template looseness interval value that indicates a loosely matched template;
   (f) determining, based upon the comparison between the determined template looseness interval value and the threshold looseness interval, which template of the plurality of templates loosely matches the two-dimensional window of received gray-scale image data, the loosely matched template being a template wherein the determined template looseness interval value associated therewith is equal to a non-zero value and the threshold looseness interval value is equal to a non-zero value, an exactly matched template being a template wherein the associated determined looseness interval value is equal to a zero value and the threshold looseness interval value is equal to a zero value; and
   (g) outputting an identifier associated with the loosely matched template such that the identifier indicates a recognized image feature.

2. The method as in claim 1, wherein the recognized image feature may a feature from a group of features including serifs, corners, vertical strokes, horizontal strokes, diagonal strokes, glyphs, platen cover marks, ink traps, paper edges, registration marks, binding holes and marks, or presence of adjacent color edges.

3. The method as in claim 1, further comprising:
   (h) determining from a plurality of identifiers a recognized global image feature.

4. The method as in claim 3, wherein the recognized global image feature may a global feature from a group of global features including financial documents, secure documents, bonds, stamps, or passports.

5. The method as in claim 1, further comprising:
   (h) increasing the contrast of the recognized feature based upon the outputted identifier.

6. The method as in claim 1, further comprising:
   (h) darkening the recognized feature based upon the outputted identifier.

7. The method as in claim 1, further comprising:
   (h) thinning the recognized feature based upon the outputted identifier.

8. The method as in claim 1, wherein the recognized image feature is an adjacent colored edged.

9. The method as in claim 1, wherein the determined plurality of looseness intervals are determined from various color separations.

10. The method as claimed in claim 1, wherein the determined looseness interval value for the template is the average looseness interval value determined from the plurality of determined looseness intervals.

11. The method as in claim 1, further comprising:
    (h) using, when more than one template loosely matches the two-dimensional window of received gray-scale image data, an arbitration process to select the most preferred loosely matched template.

12. The method as in claim 1, further comprising:

(h) creating an image plane being composed of the outputted identifiers.

13. A method for feature recognition using a method for matching a plurality of templates with a received image comprising:

(a) receiving an image comprised of gray-scale image data;

(b) generating a two-dimensional window of the received gray-scale image data, the two-dimensional window having a target gray-scale pixel and a plurality of surrounding gray-scale pixels, each gray-scale pixel being associated with a pixel of received gray-scale image data in the two-dimensional window;

(c) determining a plurality of looseness intervals for one template from a plurality of templates, each looseness interval being a difference between a gray-scale pixel associated with the two-dimensional window and a template gray scale pixel from the template and corresponding to the pixel location in the two-dimensional window;

(d) comparing each non-zero looseness interval of the plurality of looseness intervals with a threshold looseness interval to determine a looseness interval number for the template, the looseness interval number being equal to how many non-zero looseness intervals within the set of looseness intervals are less than the threshold looseness interval;

(e) selecting the template of the plurality of templates having a greatest associated looseness interval number as the template that loosely matches the two-dimensional window of received gray-scale image data; and (f) outputting an identifier associated with the loosely matched template such that the identifier indicates a recognized image feature.

14. The method as in claim 13, wherein the recognized image feature may a feature from a group of features including serifs, corners, vertical strokes, horizontal strokes, diagonal strokes, glyphs, platen cover marks, ink traps, paper edges, registration marks, binding holes and marks, or presence of adjacent color edges.

15. The method as in claim 13, further comprising:

(g) increasing the contrast of the recognized feature based upon the outputted identifier.

16. The method as in claim 13, further comprising:

(g) darkening the recognized feature based upon the outputted identifier.

17. The method as in claim 13, further comprising:

(g) thinning the recognized feature based upon the outputted identifier.

18. The method as in claim 13, wherein the recognized image feature is an adjacent colored edged.

19. The method as in claim 13, further comprising:

(g) using, when more than one template loosely matches the two-dimensional window of received gray-scale image data, an arbitration process to select the most preferred loosely matched template.

20. The method as in claim 13, further comprising:

(g) creating an image plane being composed of the outputted identifiers.

* * * * *